US 8,806,366 B2

(12) United States Patent
Kim et al.

(10) Patent No.: US 8,806,366 B2
(45) Date of Patent: Aug. 12, 2014

(54) MEDIA FILE MANAGEMENT SYSTEM AND METHOD FOR HOME MEDIA CENTER

(75) Inventors: Eunhyung Kim, Seoul (KR);
Junghyeob Lee, Suwon (KR)

(73) Assignee: Samsung Electronics Co., Ltd.,
Suwon-si (KR)

(*) Notice: Subject to any disclaimer, the term of this patent is extended or adjusted under 35 U.S.C. 154(b) by 214 days.

(21) Appl. No.: 13/166,962

(22) Filed: Jun. 23, 2011

(65) Prior Publication Data

US 2011/0320483 A1    Dec. 29, 2011

Related U.S. Application Data

(63) Continuation of application No. 10/647,300, filed on Aug. 26, 2003, now Pat. No. 7,991,810.

(30) Foreign Application Priority Data

Feb. 18, 2003   (KR) .................. 10-2003-0010189

(51) Int. Cl.
*G06F 3/048* (2013.01)
*G03G 15/00* (2006.01)

(52) U.S. Cl.
CPC ............................. *G03G 15/5016* (2013.01);
*Y10S 707/913* (2013.01)
USPC ........... 715/792; 707/913; 715/255; 715/273;
715/701; 715/724; 715/769

(58) Field of Classification Search
CPC .......... G03G 15/5016; G03G 15/5087; G03G
15/502; G06F 3/0482
USPC .......... 707/913; 715/716, 810, 255, 273, 701,
715/724, 769, 792; 345/902
See application file for complete search history.

(56) References Cited

U.S. PATENT DOCUMENTS 6,229,524 B1    5/2001    Chernock et al.
6,237,025 B1    5/2001    Ludwig et al.
(Continued)

FOREIGN PATENT DOCUMENTS

JP         7-182366 A      7/1995
JP        10-276388 A     10/1998
(Continued)

OTHER PUBLICATIONS

Myers et al., "JCDL'01", Jun. 24-28, Roanoke, Virginia, pp. 106-115.

(Continued)

*Primary Examiner* — Cheyne D Ly
(74) *Attorney, Agent, or Firm* — Sughrue Mion, PLLC

(57) ABSTRACT

The present invention provides a media file management system and method for a home media center, which enable media files such as images or photos, music and movies included in a variety of information appliances to be conveniently edited on a screen of a display apparatus connected to a home media center. A search window in which media files to be searched are displayed or an edit window in which a media file to be edited is displayed are created. Then, if a user selects a file edit command for a media file displayed in the search window, the selected file edit command is executed and results of the execution of the file edit command are displayed in the edit window.

18 Claims, 12 Drawing Sheets

(56) References Cited

U.S. PATENT DOCUMENTS

| | | |
|---|---|---|
| 6,351,765 B1 | 2/2002 | Pietropaolo et al. |
| 6,400,378 B1 * | 6/2002 | Snook .......................... 715/716 |
| 6,573,908 B1 | 6/2003 | Jang |
| 6,691,138 B1 | 2/2004 | Kirkpatrick et al. |
| 6,917,965 B2 * | 7/2005 | Gupta et al. ................. 709/206 |
| 7,017,123 B2 * | 3/2006 | Chickles et al. ............. 715/816 |
| 7,890,886 B2 | 2/2011 | Matthews et al. |
| 2002/0091702 A1 * | 7/2002 | Mullins .......................... 707/100 |
| 2002/0129036 A1 | 9/2002 | Ho Yuen Lok et al. |
| 2003/0005454 A1 | 1/2003 | Rodriguez et al. |
| 2003/0117431 A1 | 6/2003 | Moriwake et al. |
| 2003/0160824 A1 * | 8/2003 | Szumla ......................... 345/769 |

FOREIGN PATENT DOCUMENTS

| | | |
|---|---|---|
| KR | 97-4708 | 1/1997 |
| KR | 1999-010559 U | 3/1999 |
| KR | 2002-0014078 A | 2/2002 |
| WO | 02/054769 A1 | 7/2002 |

OTHER PUBLICATIONS

Fernandez, J., WAVs MIDIs & RealAuto, MIS: Press, p. 61, 1998.

Perry, G., "SAMS Teach Yourself Windows 98 in 24 Hours", Sam Publishing, pp. 16-17, and 42-43, 1998.

* cited by examiner

Fig. 6
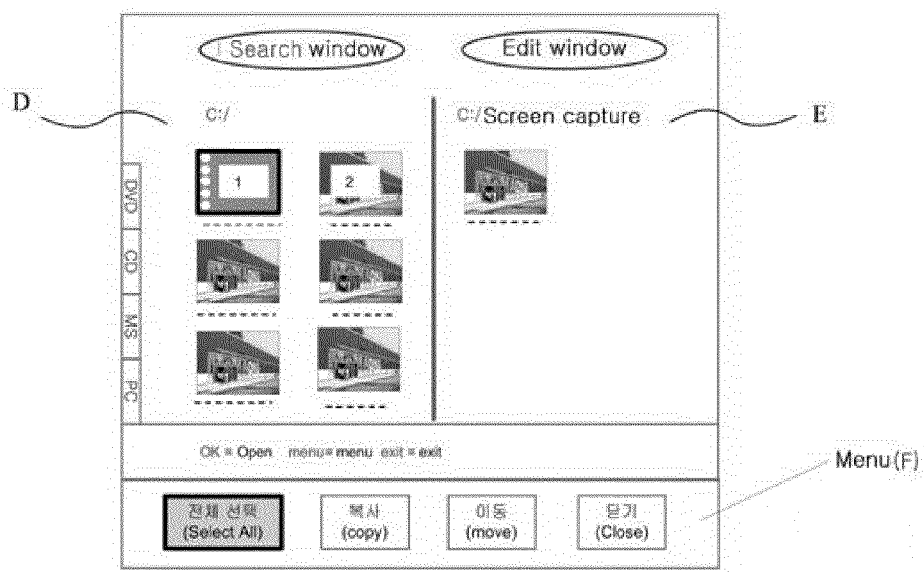
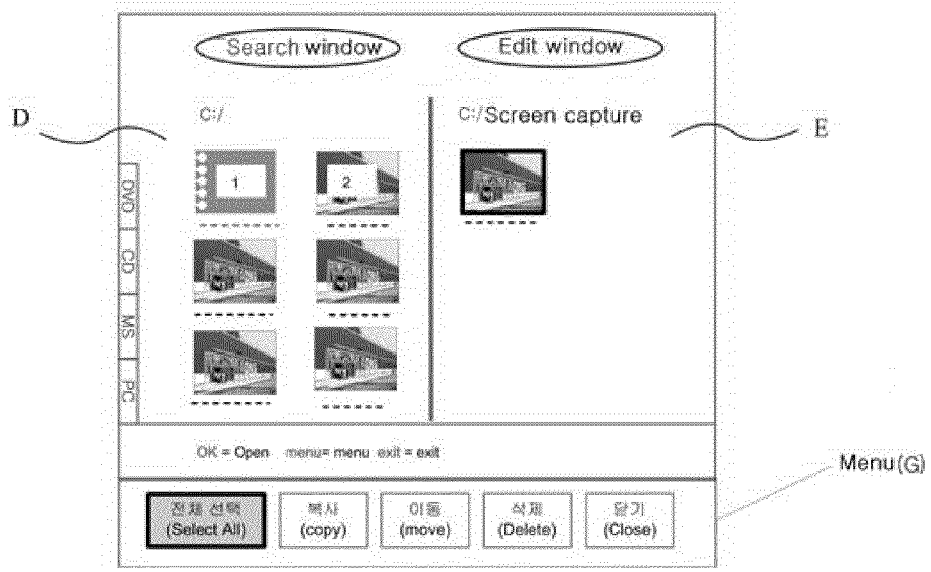

Fig. 7
(a)
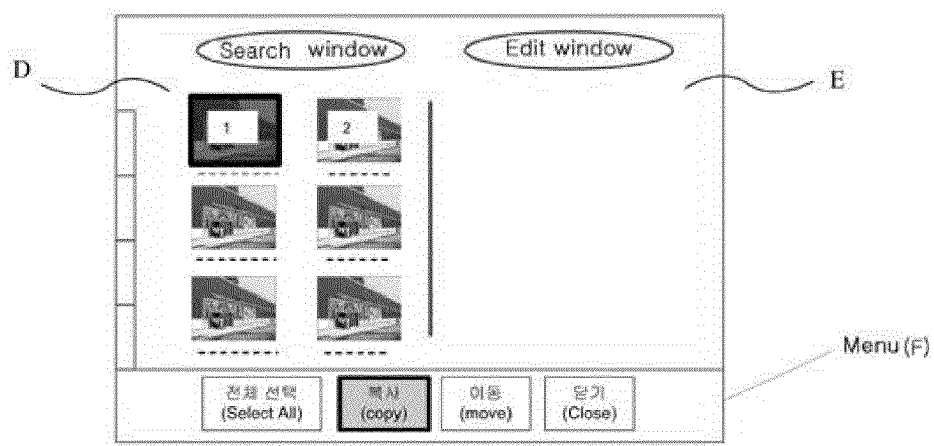
(b)
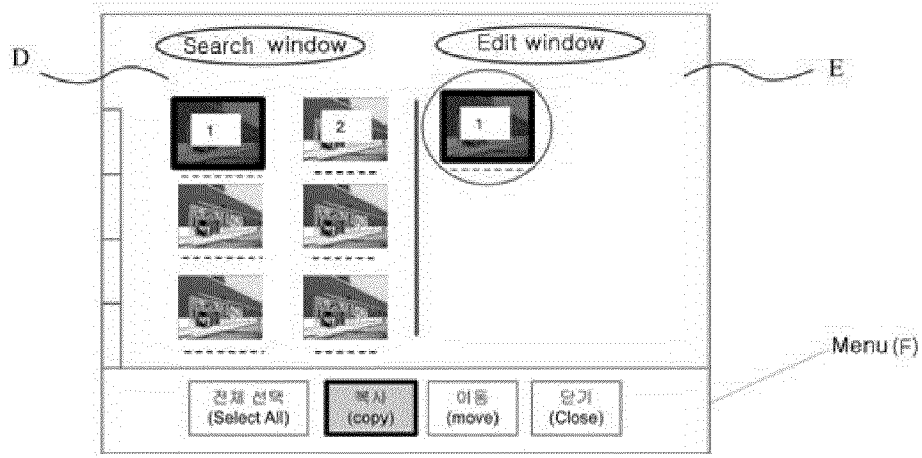

Fig. 8
(a)
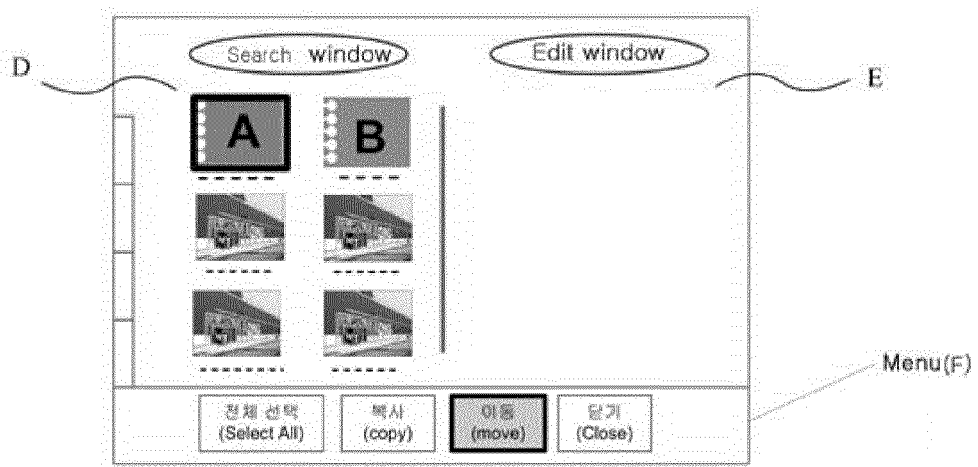
(b)
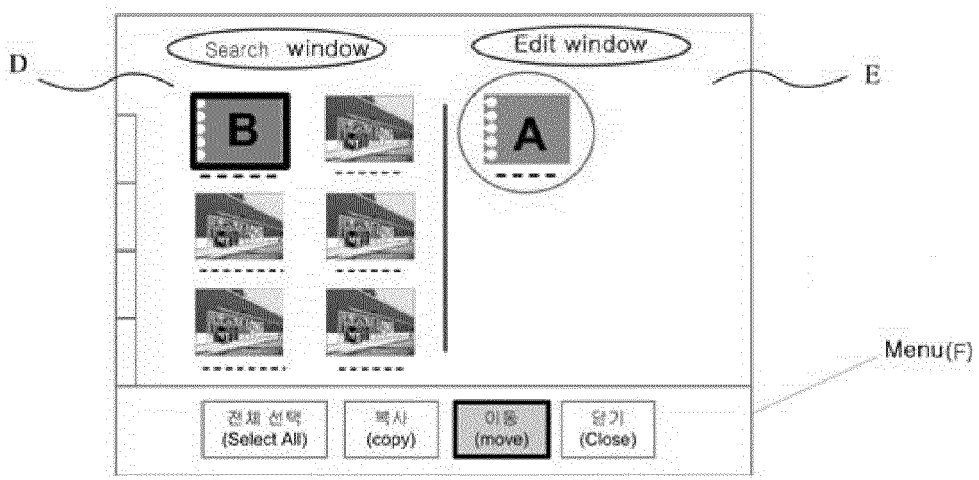

Fig. 9
(a)
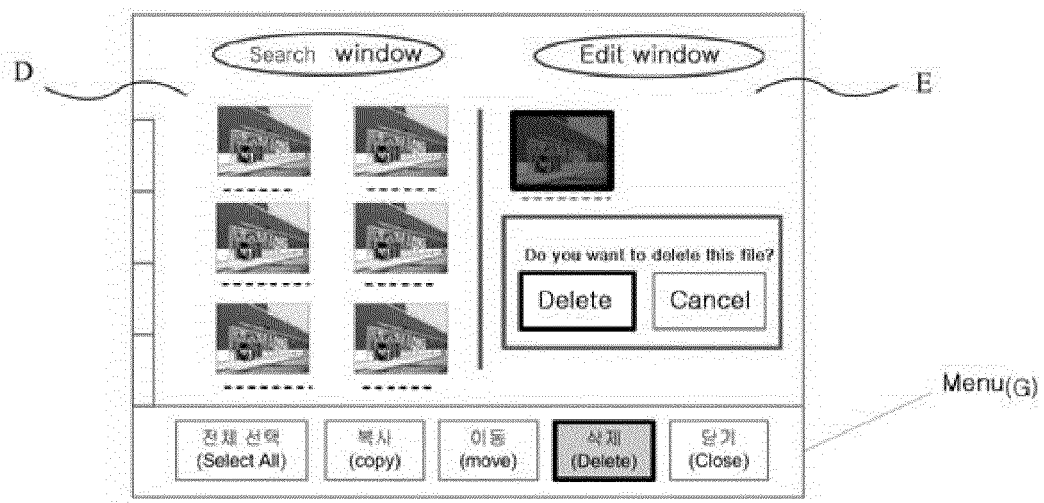
(b)
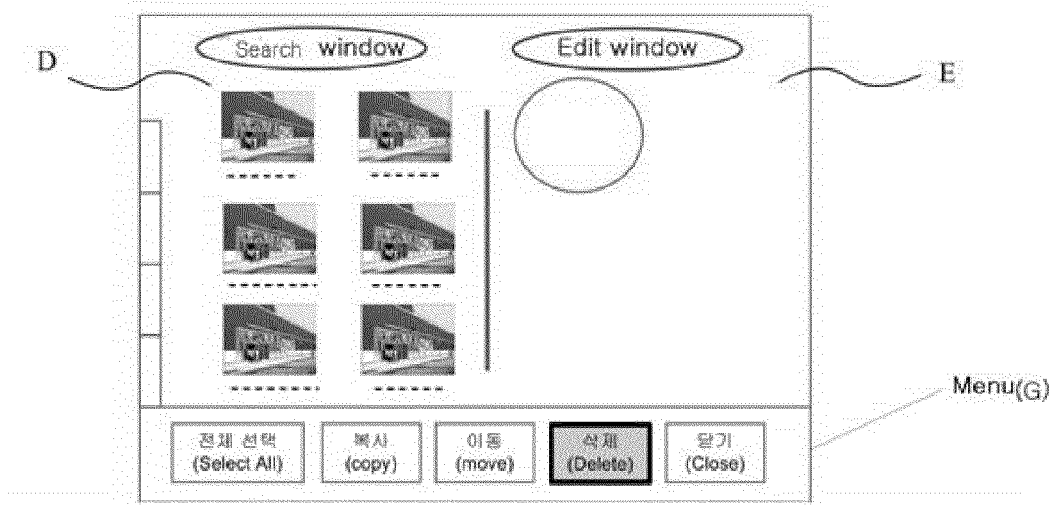

Fig. 10
(a)
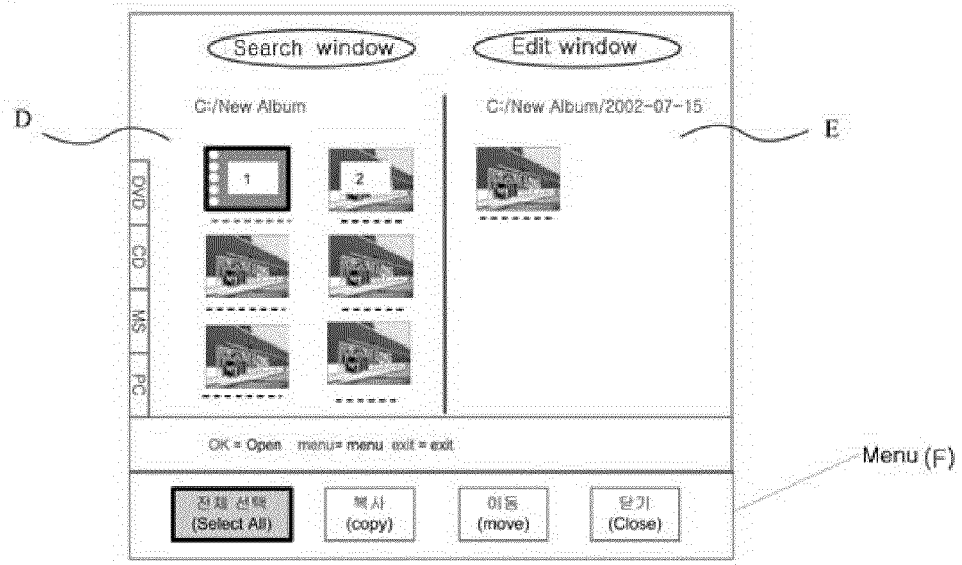
(b)
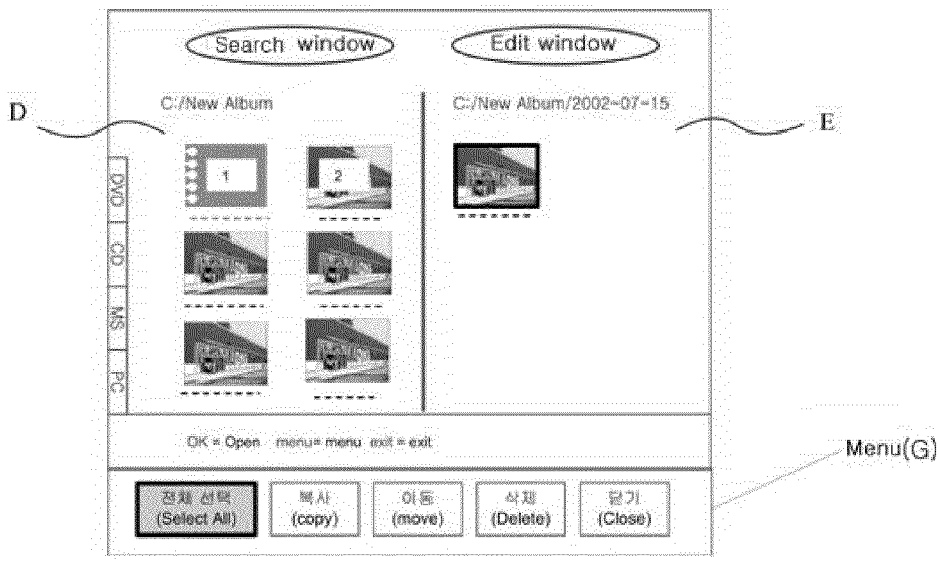

Fig. 12
(a)
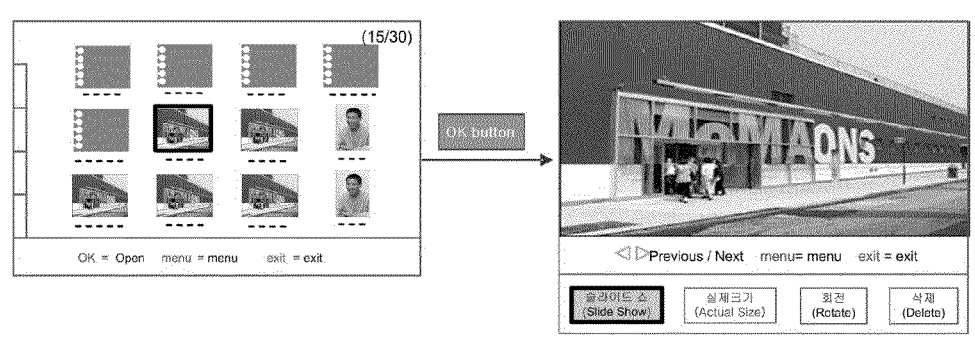
(b)
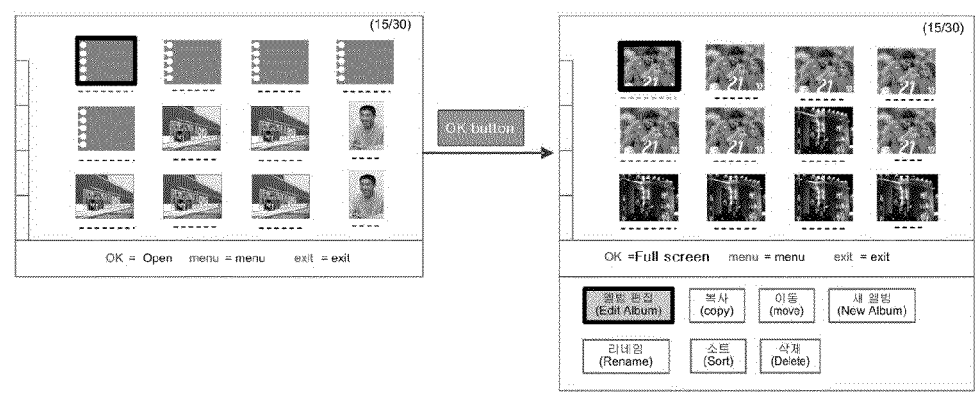

MEDIA FILE MANAGEMENT SYSTEM AND METHOD FOR HOME MEDIA CENTER

CROSS-REFERENCE TO RELATED APPLICATIONS

This is a Continuation Application of U.S. application Ser. No. 10/647,300 filed Aug. 26, 2003 which claims priority to Korean Application No. 10-2003-0010189 filed Feb. 18, 2003. The entire disclosures of the prior Applications are incorporated herein by reference.

BACKGROUND OF THE INVENTION

This application claims foreign priority under 35 U.S.C. §119, based on Korean Application No. 10-2003-0010189, filed Feb. 18, 2003, the contents of which is incorporated herein by reference.

FIELD OF INVENTION

The present invention relates to a media file management system and method for a home media center that controls the contents of digital information appliances coupled through a home network. More particularly, the present invention relates to a media file management system and method that enable media files to be conveniently edited by using an input device, such as a remote control as an input means in a home media center that controls media files such as images, music and movies that are included in a variety of digital information appliances through a home network.

DESCRIPTION OF THE RELATED ART

Along with recent developments and the popularity of a variety of related art digital information appliances such as PCs, including desktop and laptop computers, DTVs, DVD players, digital camcorders and digital cameras, applications for creating new digital contents, as well as editing and playing the created digital contents on PCs by using these digital information appliances have been widely utilized. Further, technologies enabling users to easily gain access to digital contents stored in information appliances through home networks as well as PCs are rapidly being developed.

Related art digital information appliances including DTVs are now attracting public attention as a major means of providing contents. As a result, there is a need for a means of enabling everyone to easily edit and enjoy digital media contents, which have been created using digital information appliances on a home network, through a display apparatus connected to a device for controlling the digital information appliances via the home network.

As an example of such a related art means of editing media contents, Korean Utility Model Laid-Open Publication No. 1999-010559 entitled "Television with an album function" discloses a method of performing the screen capture of input video signals, storing the captured image data in an album memory and displaying the image data stored in the album memory on a screen according to operations of a remote control by a user.

However, that related art scheme has various problems and disadvantages. For example, but not by way of limitation, since the television with the album function is constructed to display only image data stored in the television, there is a related art problem in that the television cannot gain access to text, images, music and movies stored in other external appliances such as PCs, CDs and DVDs.

Further, in the case of copying media files through a TV screen in the television with the album function, a folder containing a media file to be copied should be searched. Then, the media file should be copied and movement should be made to a folder into which the media file will be copied, via remote control. To this end, plural operations of buttons need to be performed. Thus, there is a problem in that it is very inconvenient for a user to utilize the television.

SUMMARY OF THE INVENTION

An object of the present invention is to provide a media file management system and method for a home media center, which enable media files included in a variety of information appliances to be conveniently edited on a screen of a display apparatus connected to a home media center that controls the digital information appliances through a home network.

According to the present invention for achieving the object, there is provided a media file management system for a home media center, including a control signal input unit that receives at least one control signal transmitted from an input device to control operations of the home media center, and a media file management unit that creates a search window that displays media files to be searched and an edit window that displays a media content file to be edited, when the media file is required to be edited, and searching and managing the media files through the search window or the edit window in accordance with the at least one control signal.

Additionally, a media file management method for a home media center is provided, including the steps of: creating one of a search window that displays a plurality of media files to be searched, and an edit window that displays a media file to be edited from said plurality of media files, and selecting a file edit command for a selected one of the media files displayed in the search window. Also, the step of while in the edit window, displaying results of the execution of the file edit command for the selected media file, is included.

The foregoing method may also be implemented as a computer readable medium configured to store a set of instructions for performing media file management for a home media center.

BRIEF DESCRIPTION OF THE DRAWINGS

The above and other objects and features of the present invention will become apparent from the following description of preferred embodiments given in conjunction with the accompanying drawings, in which:

FIGS. 6 (a) and (b) are views showing a screen configuration for album file editing of the image application according to an exemplary, non-limiting embodiment of the present invention;

FIGS. 7 (a) and (b) are views explaining a method of copying a file according to an exemplary, non-limiting embodiment of the present invention;

FIGS. 8 (a) and (b) are views explaining a method of moving a file according to an exemplary, non-limiting embodiment of the present invention;

FIGS. 9 (a) and (b) are views explaining a method of deleting a file according to an exemplary, non-limiting embodiment of the present invention;

FIGS. 10 (a) and (b) are views showing a screen configuration for new album creation of the image application according to an exemplary, non-limiting embodiment of the present invention;

FIGS. 12 (a) and (b) are views explaining functions of an OK button of the input device on the image application according to an exemplary, non-limiting embodiment of the present invention.

DESCRIPTION OF THE PREFERRED EMBODIMENTS

Hereinafter, a media file management system for a home media center according to the present invention will be described in detail with reference to the accompanying drawings.

Figure 1:
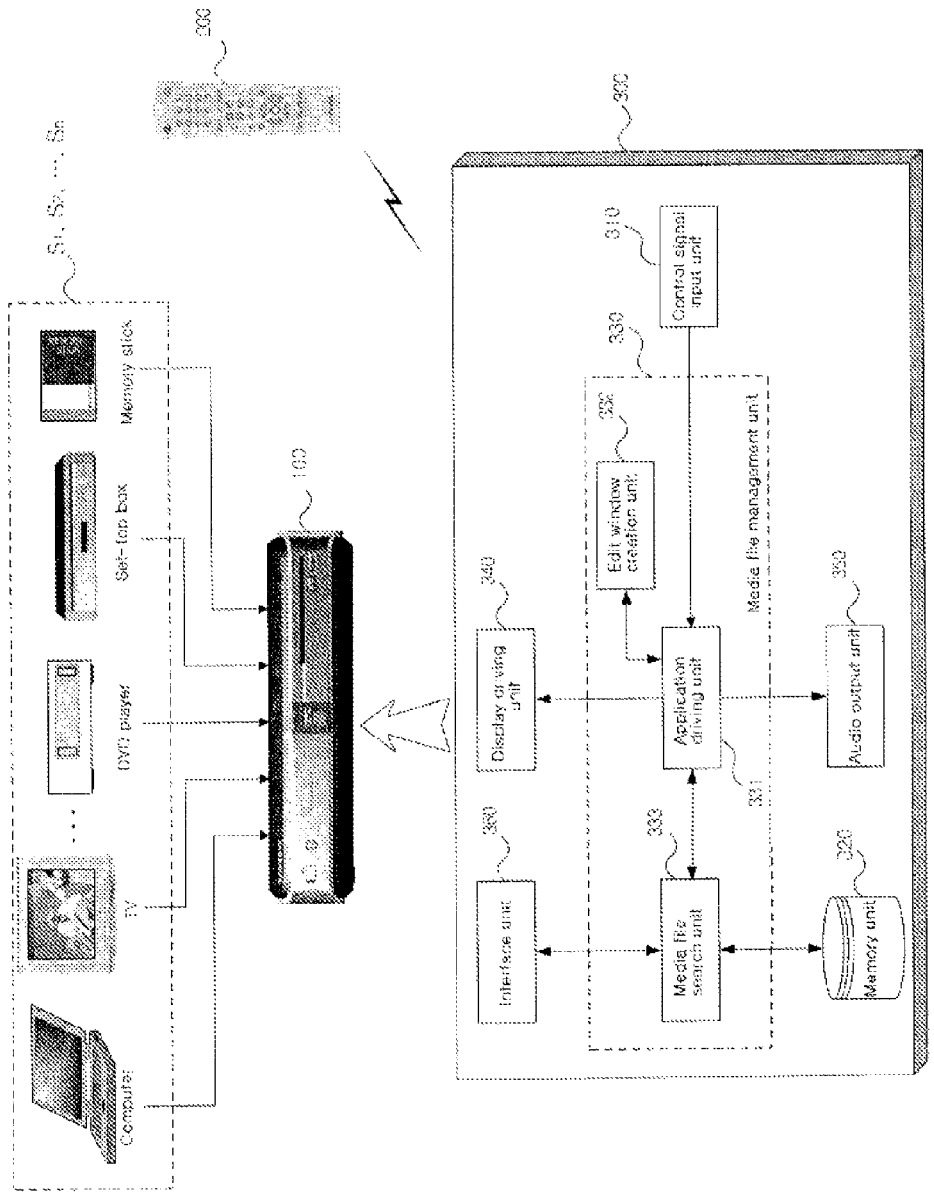
FIG. 1 is a schematic block diagram of a media file management system for a home media center according to an exemplary, non-limiting embodiment of the present invention.

FIG. 1 is a schematic block diagram of the media file management system for the home media center according to the present invention. The media file management system 300 is included in the home media center 100 connected to a variety of information appliances $S_1, S_2, \ldots, S_n$ such as a computer, a TV, a DVD player and a set-top box, through a home network. Accordingly, the media file management system 300 manages media files such as images or photos, music and movies included in the home media center 100 or other information appliances S1, S2, ..., Sn in response to control signals from an input device 200.

Figure 2:
FIG. 2 is a view illustrating functions of the home media center shown in FIG. 1 according to an exemplary, non-limiting embodiment of the present invention.

The home media center 100 is a home multimedia control apparatus capable of universally controlling a variety of information appliances $S_1, S_2, \ldots, S_n$ (e.g., PCs including desktop and laptop computers, DTVs, DVD players, digital camcorders and digital cameras) through the home network. As shown in FIG. 2, the home media center 100 can perform a home TV function related to TV control; a home media function related to the management of multimedia files such as images or photos/music/movies and the like; a home theater function related to the control of CDs/DVDs/VCDs; a home network function for providing total solutions for entertainment, information, communications, home security and home automation; and a setting function related to environmental settings of the home network.

That is, the home media center 100 is an advanced multimedia control apparatus by which programs of a TV can be seen, heard and recorded in addition to conventional functions of home theater. Also, appreciation of music and DVD programs, and movies, music, photos and the like can be managed in substantially the same manner as an album. Particularly, the media file management system 300 allows a user to easily edit and enjoy the media files included in the digital information appliances, in view of the home media function.

Figure 3:
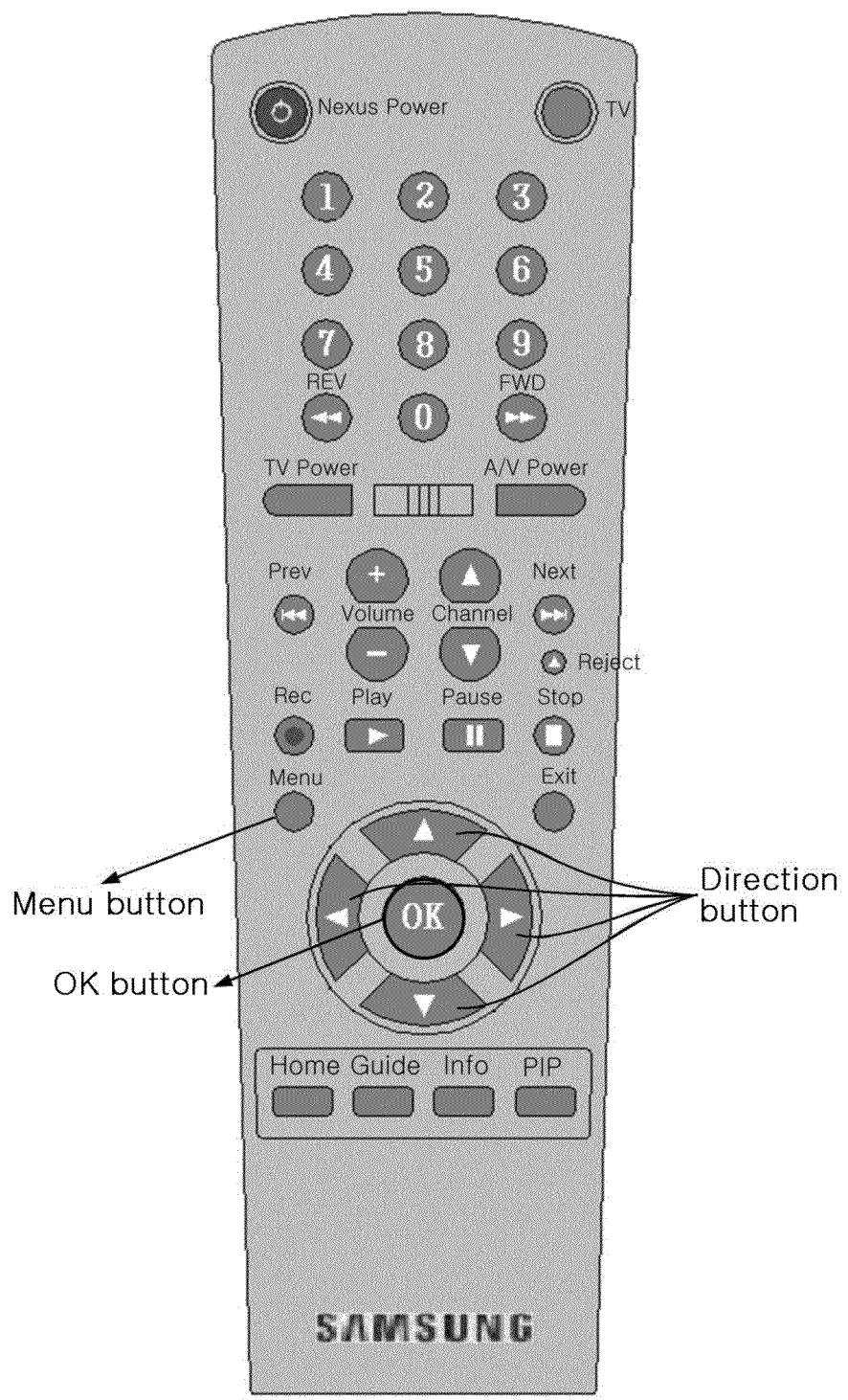
FIG. 3 is a view showing an input device for controlling the media file management system for the home media center according to an exemplary, non-limiting embodiment of the present invention.

The input device 200 outputs predetermined control signals for controlling the home media center 100 or information appliances $S_1, S_2, \ldots, S_n$ based on a button input from the user. As shown in FIG. 3, it is preferred that the input device 200 be a device which has a predetermined universal remote control function and includes a power button, number buttons, channel select buttons, volume control buttons, direction buttons, an OK button and a menu button.

In particular, the direction buttons and the OK button of the input device 200 are used as search buttons and a select button for the media files, respectively, upon editing the media files. The input device 200 may further include a play button, a skip button, a pause button and a stop button related to playing music and movies, in addition to the aforementioned buttons.

Referring again to FIG. 1, the media file management system 300 for the home media center according to this exemplary, non-limiting embodiment of the present invention includes a control signal input unit 310, a memory unit 320, a media file management unit 330, a display driving unit 340, an audio output unit 350, and an interface unit 360.

The control signal input unit 310 functions to receive predetermined control signals from the input device 200, and transmits the received control signals to the media file management unit 330. The input device 200 may further include a variety of function buttons implemented as hardware in the home media center 100. In such a case, when the user selects a specific button among the function buttons, the control signal input unit 310 transmits a control signal corresponding to the selected button to the media file management unit 330.

A variety of media files, such as images or photos, music and movies, or album files including a plurality of media files can be stored in the memory unit 320. Here, each of the album files contains the plurality of media files in a similar manner to a folder in Windows Search. However, other organization structures may also be used. Therefore, the user can organize desired images or photos, music and movies into a single album file.

In other words, all media files or album files in the home media center 100 can be stored in the memory unit 320. In addition, media files searched for in the other information appliances $S_1, S_2, \ldots, S_n$ connected to the home network can also be stored in the memory unit 320.

Here, each of the media files includes additional data for indicating the kind of media contents. The memory unit 320 can automatically classify the media files according to respective kinds thereof based on the additional data, and then store the classified media files therein.

The additional data may include, for example, but not by way of limitation, attribute information on the media files. In case of music files, the additional data may include artist name and kind of music, and the like. The additional data rather than actual media files may be stored in the memory unit 320 by using such additional data and storage paths of the files.

In the meantime, the media file management unit 330 includes an application driving unit 331 for driving relevant applications according to the kinds of media files selected and managing the media files through the applications; an edit window creation unit 332 for creating a search window in which media files to be searched upon editing a media file are displayed, or an edit window in which a media file to be edited is displayed; and a media file search unit 333 for searching for media files stored in the memory unit 320 or other information appliances $S_1, S_2, \ldots, S_n$.

That is, the media file management unit 330 searches for the media files included in the home media center 100 or the digital information appliances $S_1, S_2, \ldots, S_n$ connected to the home media center 100 through the home network in response to the control signals from the control signal input unit 310. The media file management unit 330 further divides a screen into the search window and the edit window upon editing a media file to simultaneously control media files to be searched and a media file to be edited, so that the media files can be conveniently edited and managed. Edit operations of the media file management unit 330 will be described in detail later in conjunction with FIG. 4.

The display driving unit 340 functions to cause execution results obtained according to the user's button input to be displayed on a display apparatus (e.g., screen) connected to the home media center 100. Here, the display apparatus may include a TV, a monitor and the like, but it is not limited thereto. The display driving unit 340 properly converts the execution results obtained according to the user's button input into a format supported by a relevant display apparatus, and outputs the converted execution results to the display apparatus.

When the user selects the play function for a music or movie file, the audio output unit 350 decodes and converts the selected music or movie file into audio signals which the user can listen to, and outputs the audio signals. If a reproducing apparatus capable of playing music or movie files is connected to the home media center 100, it is also possible to play the music or movie files through the connected reproducing apparatus.

The interface unit 360 gives access to the media files stored in a variety of storage media and information appliances $S_1$, $S_2$, ..., $S_n$, for example, but not by way of limitation, PCs, TVs, DVD players, set-top boxes, memory sticks and the like, connected to the home media center 100. The interface unit 360 can use a variety of communication protocols according to the kinds of information appliances connected to the home media center 100.

Meanwhile, a media file management method for the home media center according to the present invention includes the steps of creating the search window in which media files to be searched are displayed or the edit window in which a media file to be edited is displayed; selecting a file edit command for a selected one of the media files displayed in the search window; and displaying results of the execution of the file edit command for the media file selected in the search window in the edit window.

Figure 4:
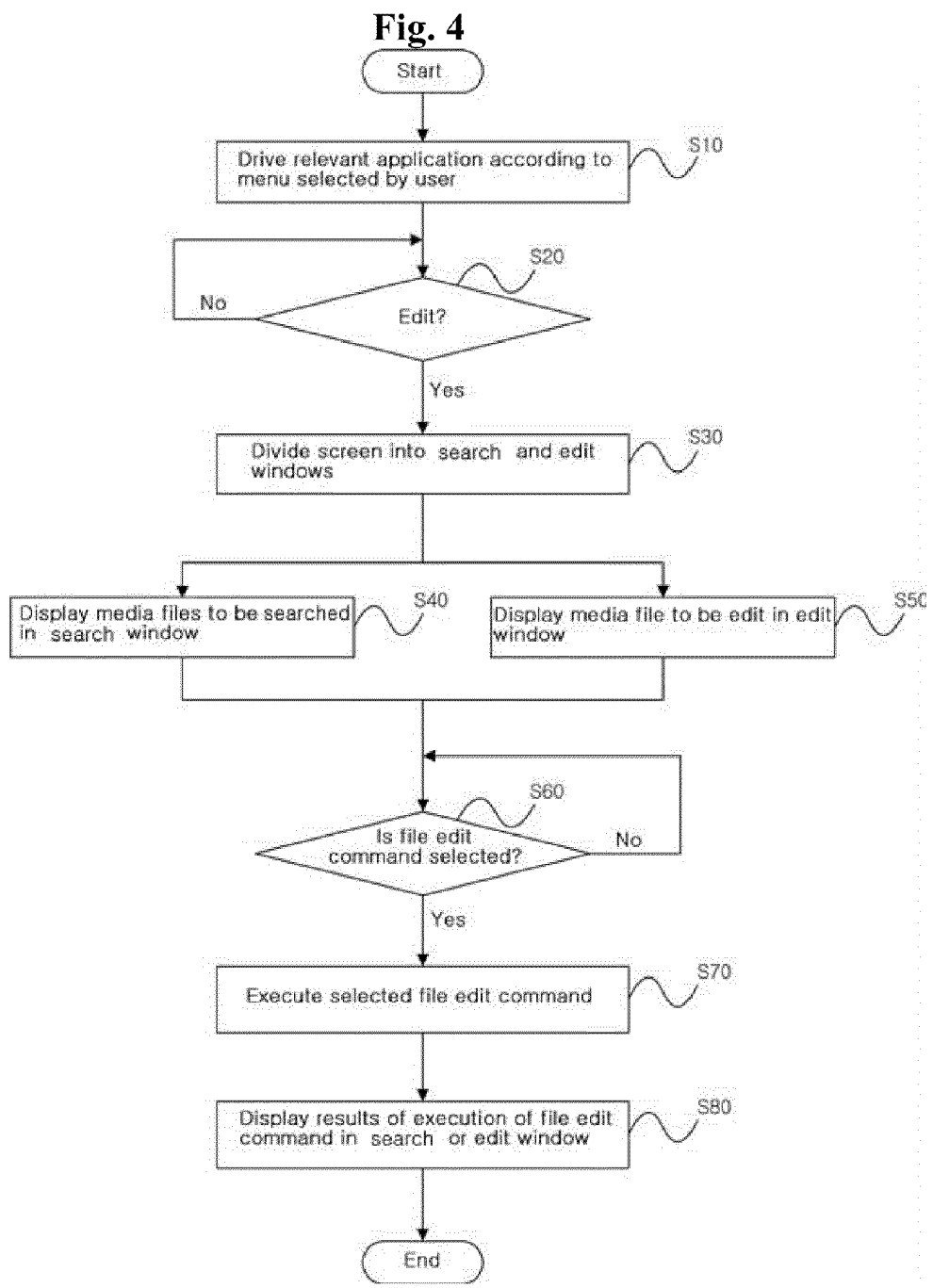
FIG. 4 is a flowchart generally illustrating a media file management method for a home media center according to an exemplary, non-limiting embodiment of the present invention.

FIG. 4 is a flowchart illustrating the media file management method for the home media center according to the present invention. In a first step S10, a relevant application is driven, based on the menu selected by the user. At step S20, it is determined whether an editing operation is to be performed. If such an editing operation is to be performed, then at step S30, the screen is divided into a search window and an edit window.

Next in the simultaneous steps of S40 and S50, the media files to be searched are displayed in the search window (step S40), and the media file to be edited is displayed in the edit window (step S50). At step S60, it is determined whether a file edit command has been selected. If a file edit command has been selected, then the method proceeds to step S70, in which the selected file edit command is executed. After step S70, the results of the execution of the file edit command are displayed in the search window and/or the edit window, as step S80.

The specific file edit commands with respect to the foregoing are discussed herein. However other related art file commands may also be used, such that the present invention is not limited thereto.

If the user selects any one of the home media menus such as images or photos, music and movies by using the input device 200 (refer to FIG. 3), the media file management unit 330 drives the relevant application according to the menu selected by the user, and searches for media files according to the menu selected by the user in the home media center 100 or the plurality of information appliances $S_1$, $S_2$, ..., $S_n$. The media file management unit 330 then causes the searched media files to be displayed on the screen of the display apparatus connected to the home media center 100.

Here, the application may vary according to the menu (the kind of media file) selected by the user. For example, an image application with an image viewer function is driven in a case where the user selects the "Image (Photo)" menu, an audio application with a music playing function in a case where the user selects the "Music" menu, and a movie application with a movie playing function in a case where the user selects the "Movie" menu.

Then, the media file management unit 330 manages the media files included in the home media center 100 or other information appliances $S_1$, $S_2$, ..., $S_n$ through the applications. Hereinafter, a method of managing image files stored in the home media center 100 will be described by way of example in the present embodiment.

Figure 5:
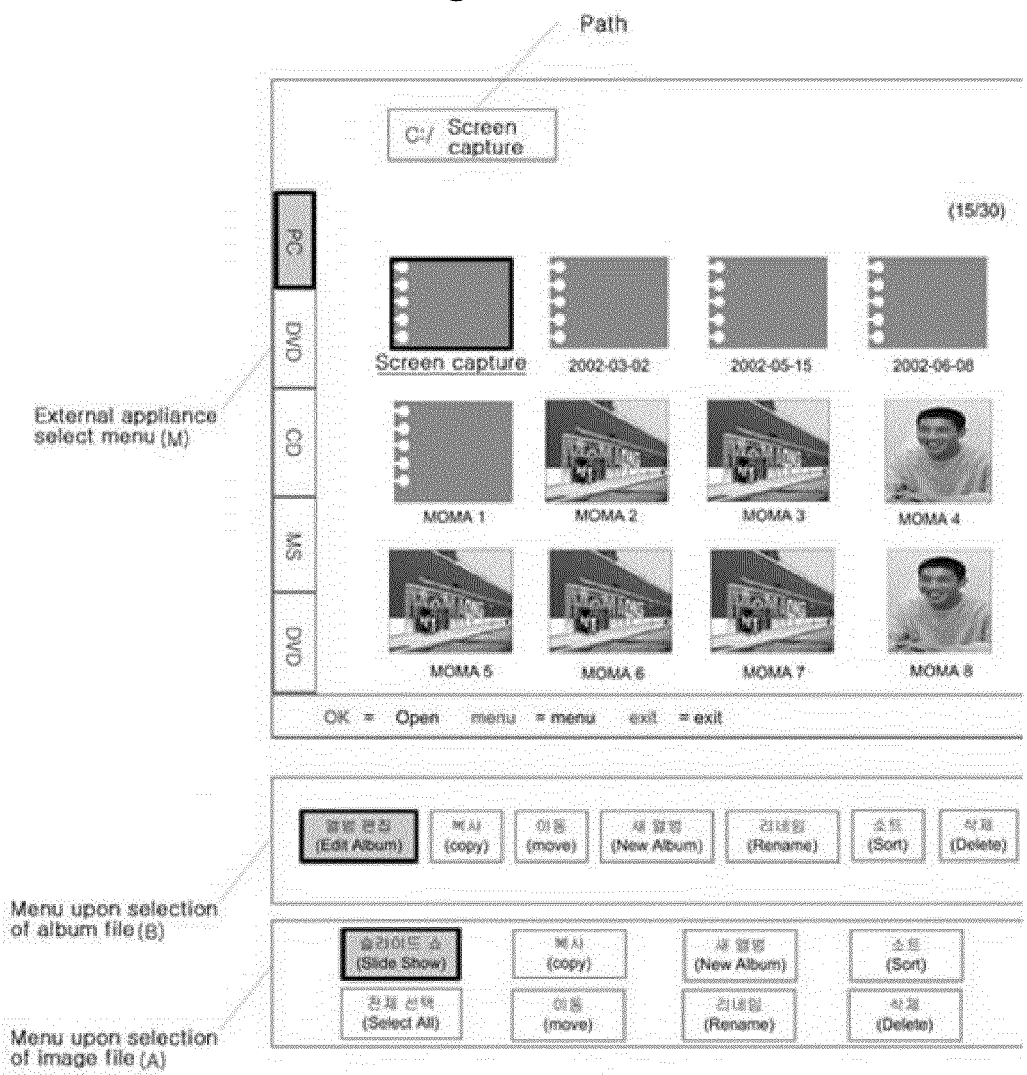
FIG. 5 is a view showing a screen configuration of an image application for implementing the present invention according to an exemplary, non-limiting embodiment of the present invention.

FIG. 5 is a view showing a screen configuration of the image application for implementing the present invention. If the user selects the "Image (Photo)" menu among the home media menus (refer to FIG. 3), the media file management unit 330 drives the image application and simultaneously searches for image files among media files stored in the memory unit 320 and then causes the searched image files to be displayed on the screen of the display apparatus connected to the home media center 100 (S10).

At this time, individual image files or album files including a plurality of image files are displayed on the screen of the display unit. The user can search the individual image files or album files using the direction buttons of the input device 200. As for a method of indicating a currently searched file, related art methods such as highlighting already searched files can be used. Therefore, a detailed description thereof will be omitted herein.

In the meantime, if the user selects a specific information appliance in an external appliance select menu M on the image application in a state where the image application is executed as shown in FIG. 5, the media file management unit 330 can search for image files included in the information appliance selected among the plurality of information appliances $S_1$, $S_2$, ..., $S_n$ connected to one another through the home network and cause the searched image files to be displayed on the screen of the display apparatus connected to the home media center 100. In this case, the media file management unit 330 may directly manage the media files included in the information appliances $S_1$, $S_2$, ..., $S_n$, or store the media files in the memory unit 320 of the home media center 100, and then manage the stored media files.

Further, the media file management unit 330 causes the full file path of the media file selected by the user through the image application to be displayed on the screen. If the full file path is too long, it may be abbreviated and then displayed in the same manner as "C:/screen.../MOMA..> 1.jpg."

Meanwhile, as shown in FIG. 5, if the user presses the menu button of the input device 200 in a state where an image file is selected, the media file management unit 330 causes menu A consisting of "Slide Show," "Copy," "New Album," "Sort," "Select All," "Move," "Rename," and "Delete" functions to be displayed on the screen. If the user presses the menu button of the input device 200 in a state where an album file containing a plurality of image files is selected, the media file management unit 330 causes menu B consisting of "Edit Album," "Copy," "Move," "New Album," "Rename," "Sort," and "Delete" functions to be displayed on the screen. The menu configuration is not limited to the details described above. It will be apparent that other menus may be added or eliminated, if necessary. Since the functions of the respective menus are substantially identical with those used in Windows for PCs, a detailed description thereof will be omitted.

Hereinafter, a media file editing method based on the image application will be described with reference to FIGS. 6 to 10. As described above in the related art, when the user wants to edit a media file on a TV screen by using a remote control, there are problems in that it is inconvenient to search files and difficult to edit the files.

To this end, the media file management unit 330 in this exemplary, non-limiting embodiment of the present invention divides the screen upon editing a file so that files to be searched and a file to be edited are simultaneously controlled. Thus, a file edit command selected by the user can be immediately executed. Hereinafter, the file edit operations of the media file management unit 330 will be described in greater detail.

If the user selects the "Edit Album" function in menu B (refer to FIG. 5) by using the direction buttons of the input device 200 (S20 of FIG. 4), the media file management unit 330 divides the screen into the search window D and the edit window E as shown in FIG. 6 (S30 of FIG. 4). Media files that the user wants to search are displayed in the search window D (S40 of FIG. 4), whereas a media file that the user want to edit is displayed in the edit window E (S50 of FIG. 4).

At this time, if the user selects the menu button of the input device 200 in a state where a file selection locator (focus) exists in the search window D, the media file management unit 330 causes menu F consisting of "Select All," "Copy," "Move," "Close," functions and the like to be displayed on the screen, as shown in FIG. 6 (a).

Alternatively, if the user selects the menu button of the input device 200 in a state where the file selection locator exists in the edit window E, the media file management unit 330 causes menu G consisting of "Select All," "Copy," "Move," "Delete," "Close," functions and the like to be displayed on the screen, as shown in FIG. 6 (b).

If the user selects any one of these functions by manipulating the direction buttons of the input device 200 (S60 of FIG. 4), the media file management unit 330 immediately executes a file edit command according to the selected function and causes results of the execution of the file edit command to be displayed in the search window D or edit window E (S70 and S80 of FIG. 4). This will be described in more detail below.

When the user selects a single image file in the search window D and then selects the "Copy" function as shown in FIG. 7 (a), the media file management unit 330 immediately copies the relevant image file into the edit window E as shown in FIG. 7 (b).

Alternatively, when the user selects a single image file in the search window D and then selects the "Move" function as shown in FIG. 8 (a), the media file management unit 330 immediately moves the relevant image file into the edit window E as shown in FIG. 8 (b).

Third, in a case where the user selects a single image file in the edit window E and then selects the "Delete" function as shown in FIG. 9 (a), the media file management unit 330 immediately deletes the relevant image file from the edit window E as shown in FIG. 9 (b).

Further, the media file management unit 330 may cause a current processing rate to be displayed on the screen upon execution of the file edit command, or a message "A file with the same name already exists" to be displayed on the screen if an image file with the same file name already exists upon copying or moving an image file.

The display of the results of the execution of the file edit command for the file selected in the search window D in the edit window E has been described. However, when the user selects a file edit command for a file displayed in the edit window E, it is also possible to cause the results of the execution of the file edit command to be displayed in the search window D.

Referring again to FIG. 5, if the user selects the "New Album" function in menu A or B by manipulating the buttons of the input device 200, an image file can be added to or deleted from a newly created album by the aforementioned screen division method. In this case, the newly created album is displayed in the edit window E as shown in FIGS. 10(a) and 10(b).

At this time, a file name of the newly created album can be automatically created. For example, the file name can be created based on the creation date of the new album in the same manner as "2002-07-05." Alternatively, if an album file created on the same date already exists, the file name can be created by using a method of adding a number after the creation date of the album file in the same manner as "2002-08-01-1", or "2002-08-01-2".

Figure 11:
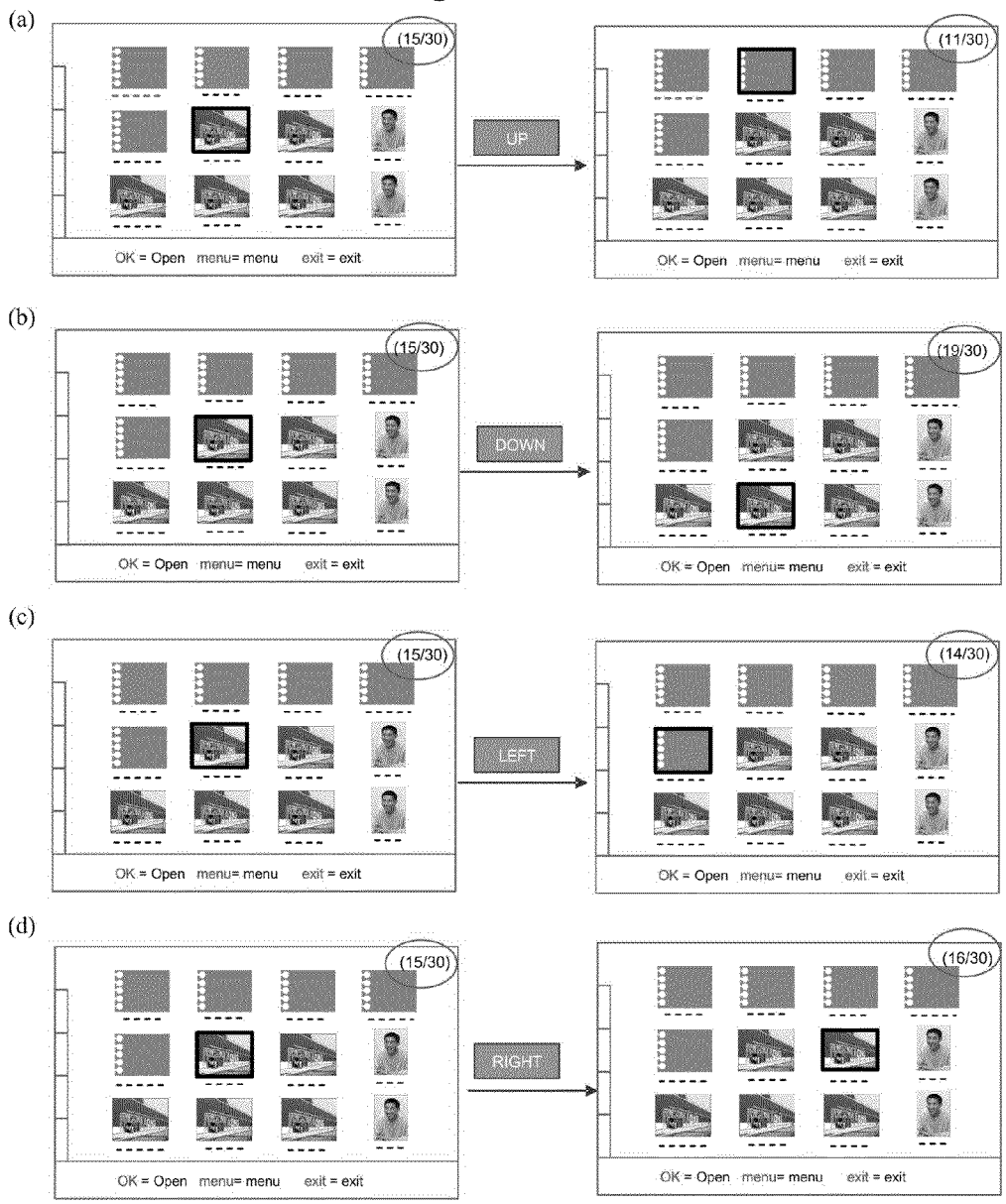
FIGS. 11 (a) to (d) are views explaining functions of direction buttons of the input device on the image application according to an exemplary, non-limiting embodiment of the present invention.

Meanwhile, if the user selects any one of the direction buttons of the input device 200, the media file management unit 330 causes the selection locator to move in up and down and right and left directions according to the selected direction button so that media files contained in a current folder can be searched as shown in FIGS. 11 (a) to (d).

Further, if the user selects the OK button of the input device 200, the media file management unit 330 causes a selected image file to be magnified and displayed on the screen as shown in FIG. 12 (a), or image files contained in an album file to be displayed on the screen as shown in FIG. 12 (b). In this case, the image application can perform operations of rotating or deleting a currently selected image file, and the like.

The foregoing steps of the presently claimed invention may also be implemented in a computer readable medium of any type. Computer readable mediums are well-known in the art, and may include disk drive, remote storage, wireless storage, and portable storage. The computer readable medium stores the steps as a set of instructions that may be implemented.

The present invention has various advantages. For example, but not by way of limitation, according to the present invention described above, the user can easily edit and manage media files such as images or photos, music and movies, which have been received from PCs, DVDs, camcorders, digital cameras and the like, on the screen of the display apparatus connected to the home media center, simply by manipulating the remote control.

Therefore, according to present invention, the user can easily edit and manage media files on the screen of the display apparatus connected to the home media center only by means of simple manipulations of the remote control.

Further, according to the present invention, since the media contents stored in other information appliances can be seen on a large screen of a TV or the like, there is an advantage in that high-level contents services can be provided to general users who are not familiar with the manipulations of PCs and small screens of monitors and thus are difficult to appreciate movies, images or photos, or the like photographed or captured by digital camcorders or cameras.

Although the present invention has been described in connection with the preferred embodiments thereof shown in the accompanying drawings, they are mere examples of the present invention. It can also be understood by those skilled in the art that various changes, modifications and equivalents thereof can be made thereto.

Particularly, although the embodiments have been described by way of example in connection with editing an image or photo file, the present invention is not limited thereto. For example, the present invention can also be applied to multimedia contents in various formats such as music and movies to which access can be given on the home media center.

What is claimed is:

1. A media file management system for a home media center, comprising: a control signal input unit that receives at least one control signal transmitted from an input device to control operations of the home media center; and a media file management unit that creates a search window that displays media files to be searched and an edit window that displays a media content file to be edited, when the media file is required to be edited, and searching and managing the media files through the search window or the edit window in accordance with the at least one control signal, wherein the media files displayed in the search window are each displayed in the form of images created from image content contained in a corresponding one of the media files, wherein a display screen is divided into at least two or more partitions, a menu screen located in one of the partitions of the display screen is changed depending on the type of media content file and the type of window screen activated in another one of the partitions of the display screen, wherein the media file management unit copies the media file selected in the search window into the edit window if a "Copy" command is selected, and moves the media file selected in the search window into the edit window if a "Move" command is selected.

2. The system as claimed in claim 1, further comprising:
a memory unit that stores the media file edited by the media file management unit; and
a display driving unit that generates displayable results of the editing of the media file by the media file management unit.

3. The system as claimed in claim 1, further comprising an interface unit that accesses media files stored in another information appliance.

4. The system as claimed in claim 1, wherein the at least one control signal received by the control signal input unit is output by an input device with a predetermined universal remote control function.

5. The system as claimed in claim 1, wherein the media files are album files containing at least one of image, music or movie files.

6. The system as claimed in claim 1, wherein the media file management unit comprises:
an application driving unit that drives a relevant application according to a type of media file selected, and manages the media file through the relevant application;
an edit window creation unit that creates the search window or the edit window; and
a media file search unit that searches for media files stored in at least one of the memory unit and another information appliance.

7. The system as claimed in claim 6, wherein the application driving unit causes paths of the media files searched by the media file search unit to be displayed in the edit window or the search window.

8. The system as claimed in claim 1, wherein the media file management unit causes results of the execution of a file edit command for a media file selected in the search window to be displayed in the edit window.

9. The system as claimed in claim 1, wherein the media file management unit causes results of the execution of a file edit command for a media file selected in the edit window to be displayed in the search window.

10. The system as claimed in claim 8 or 9, wherein the file edit command includes at least one of an "Edit Album" command, a "New Album" command, a "Rename" command, a "Sort" command, a "Delete" command, and a "Select All" command.

11. A media file management method for a home media center, comprising the steps of: creating one of a search window that displays a plurality of media files to be searched, and an edit window that displays a media file to be edited from said plurality of media files; selecting a file edit command for a selected one of the media files displayed in the search window; in the edit window, displaying results of the execution of the file edit command for the selected media file; when a user selects a "Copy" command, copying the selected media file into the edit window; and when the user selects a "Move" command, moving the selected media file into the edit window, wherein the media files displayed in the search window are each displayed in the form of images created from image content contained in a corresponding one of the media files, wherein a display screen is divided into at least two or more partitions, a menu screen located in one of the partitions of the display screen is changed depending on the type of media content file and the type of window screen activated in another one of the partitions of the display screen.

12. The method as claimed in claim 11, further comprising the step of, when a user selects a file edit command for the media file displayed in the edit window, performing said displaying step.

13. The method as claimed in claim 11, further comprising the step of driving a relevant application according to a type of media file selected, and searching and managing the media files through the relevant application.

14. The method as claimed in claim 11, further comprising the step of providing access to media files stored in another information appliance.

15. The method as claimed in claim 11, wherein the media files are album files, each containing at least one of an image file, a music file or a movie file.

16. The method as claimed in claim 11, wherein paths of the media files are displayed in the edit window or the search window.

17. The method as claimed in claim 11, wherein the file edit command includes at least one of an "Edit Album" command, a "New Album" command, a "Rename" command, a "Sort" command, a "Delete" command, and a "Select All" command.

18. A non-transitory computer readable medium configured to store a set of instructions for performing media file management for a home media center, said instructions comprising: creating one of a search window that displays a plurality of media files to be searched, and an edit window that displays a media file to be edited from said plurality of media files; selecting a file edit command for a selected one of the media files displayed in the search window; and in the edit window, displaying results of the execution of the file edit command for the selected media file, said display instruction further comprising, when a user selects a "Copy" command, copying the selected media file into the edit window; and when the user selects a "Move" command, moving the selected media file into the edit window, wherein the media files displayed in the search window are each displayed in the form of images created from image content contained in a corresponding one of the media files, wherein a display screen is divided into at least two or more partitions, a menu screen located in one of the partitions of the display screen is changed depending on the type of media content file and the type of window screen activated in another one of the partitions of the display screen.

\* \* \* \* \*